United States Patent [19]

Nair

[11] Patent Number: 5,696,699
[45] Date of Patent: Dec. 9, 1997

[54] INTEGRATED CELLULAR DATA/VOICE COMMUNICATION SYSTEM WORKING UNDER ONE OPERATING SYSTEM

[75] Inventor: N. Gopalan Nair, Chandler, Ariz.

[73] Assignee: Intel Corporation, Santa Clara, Calif.

[21] Appl. No.: 387,245

[22] Filed: Feb. 13, 1995

[51] Int. Cl.$^6$ .............. H04B 15/00; H04B 3/04; H04B 1/12; H04B 1/10

[52] U.S. Cl. .............. 364/514 R; 333/18; 364/514 A; 364/574; 364/724.01; 364/724.19; 364/724.2; 375/216; 375/222; 375/232

[58] Field of Search .............. 364/514 R, 514 A, 364/514 C, 574, 724.01, 724.19, 724.2; 375/216, 222, 232; 379/59, 93; 333/18

[56] References Cited

U.S. PATENT DOCUMENTS

| | | | |
|---|---|---|---|
| 3,314,015 | 4/1967 | Simone | 333/18 |
| 4,290,139 | 9/1981 | Walsh | 375/222 |
| 4,377,860 | 3/1983 | Godbole | 375/216 X |
| 4,528,659 | 7/1985 | Jones, Jr. | 370/80 |
| 4,645,874 | 2/1987 | Fildes | 379/93 |
| 4,697,281 | 9/1987 | O'Sullivan | 379/59 |
| 4,972,457 | 11/1990 | O'Sullivan | 379/59 |
| 5,408,419 | 4/1995 | Wong | 364/514 |
| 5,410,599 | 4/1995 | Crowley et al. | 380/9 |
| 5,453,986 | 9/1995 | Davis et al. | 370/62 |
| 5,463,616 | 10/1995 | Kruse et al. | 379/93 |
| 5,535,204 | 7/1996 | Li | 375/222 X |
| 5,550,893 | 8/1996 | Heidari | 379/59 |
| 5,564,077 | 10/1996 | Obayashi et al. | 455/89 |
| 5,574,725 | 11/1996 | Sharma et al. | 379/79 |
| 5,602,902 | 2/1997 | Satterlund et al. | 379/59 |
| 5,612,991 | 3/1997 | Nair et al. | 379/59 |

OTHER PUBLICATIONS

"Mobile Station–Land Station Compatibility Specification," EIA/TIA–553, pp. 1–1 to 6–3, Sep. 1989, Electronic Industries Association Engineering Department.

Primary Examiner—Edward R. Cosimano
Attorney, Agent, or Firm—Blakely, Sokoloff, Taylor & Zafman

[57] ABSTRACT

A cellular communication system having all of its components operating under a single system control unit is provided so that the various components of the system can be adjusted as the parameters of the other components or the dynamic characteristics of the cellular channel change. The cellular communication system includes: (a) a data pump for performing modem signal processing; (b) a cellular transceiver communicatively coupled to the data pump for performing cellular signaling protocols and signal conditioning; (c) a digital-to-analog (D/A) and analog-to-digital (A/D) converter communicatively coupled to the cellular transceiver; (d) a radio transceiver communicatively coupled to the D/A & A/D converter for transmitting and receiving control commands and radio waves; (e) a host interface for interfacing the data pump to a computer host; and (f) a single system control trait for controlling the host interface, the data pump, the cellular transceiver, the D/A & A/D converter, and the radio transceiver so that the host interface, the data pump, the cellular transceiver, the D/A & A/D converter, and the radio transceiver operate under a single operating system. The cellular communication system may also include a microphone, a speaker, and an encoder and a decoder (CODEC) unit. The cellular transceiver is designed so that it can select and process either data signals from the data pump or audio signals from the CODEC unit.

23 Claims, 8 Drawing Sheets

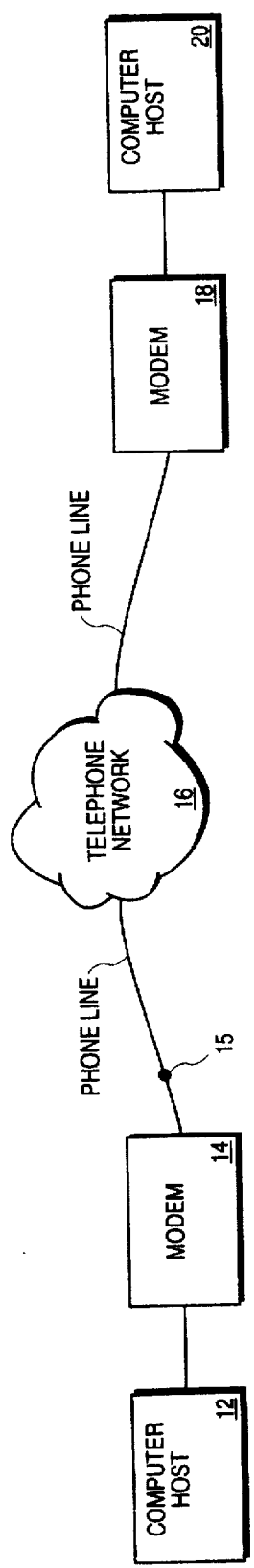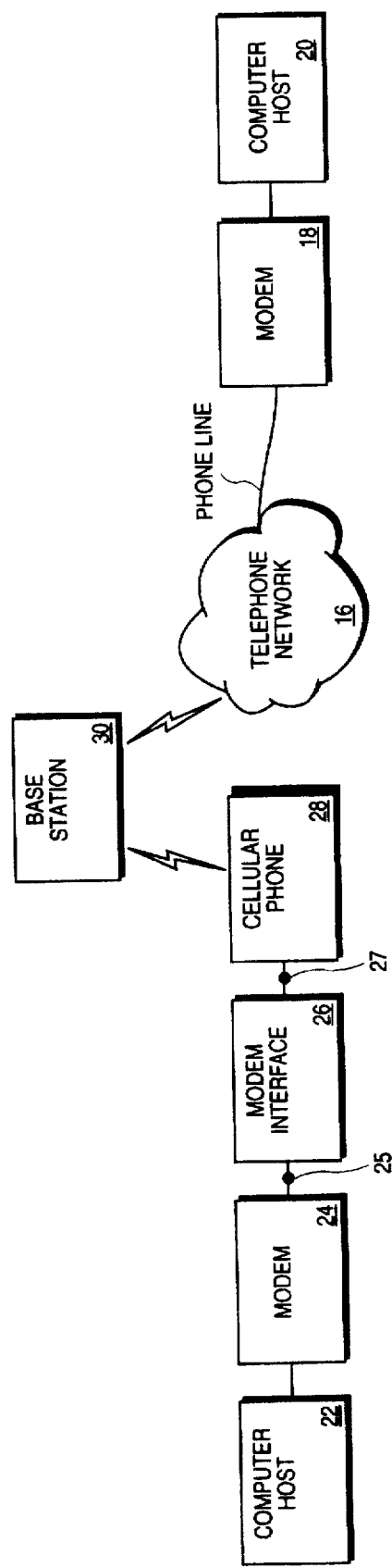
FIG. 1 (PRIOR ART)
FIG. 2 (PRIOR ART)

INTEGRATED CELLULAR DATA/VOICE COMMUNICATION SYSTEM WORKING UNDER ONE OPERATING SYSTEM

BACKGROUND OF THE INVENTION

(1) Related Application(s)

This application is related to "Use of Control Channel Information to Enhance Data Throughput of an Integrated Cellular Communication System," Ser. No. 08/387/246, assigned to the assignee of the present invention and filed concurrently herewith.

(2) Field of the Invention

The present invention relates to wireless communications systems, and more particularly to data and voice communications systems utilizing an advance mobile phone system (AMPS) cellular network.

(3) Description of the Related Art

Referring to FIG. 1, to provide communications over a telephone network, a data communication network system includes a computer host 12 and a modem 14 that is connected to a wall socket of a phone line so that data from modem 14 can be transmitted to a telephone network 16. A second modem 18 is provided to receive the data from modem 14. Modem 18 receives the data from telephone network 16 and sends it to a computer host 20. The system shown in FIG. 1 is a typical data communication network system for a wired telephone network.

A conventional wireless communication system is shown in FIG. 2. The wireless system includes a computer host 22, a modem 24, a modem interface 26, a cellular phone 28 and a base station 30. The wireless system is typically coupled to telephone network 16, modem 18 and computer host 20. In this instance, modem 18 is a landline modem. In another instance, telephone network 16 may be replaced by a cellular phone and a modem interface in which modem 18 is a mobile modem. To transmit data from computer host 22 to computer host 20, the data in computer host 22 is sent to cellular phone 28 through modem 24 and modem interface 26. Cellular phone 28, in turn, transmits the data to base station 30. Base station 30 then transmits the data to telephone network 16 which sends the data to computer host 20 through modem 18. Because modem 24 of FIG. 2 is the same as modem 14 of FIG. 1, modem interface 26 is required in the network system shown in FIG. 2. Because of modem interface 26, node 25 has the same characteristics as node 15 of FIG. 1. Modem interface 26 provides an analog path with appropriate protocols to make cellular phone 28 and base station 30 appear as a landline telephone network. Modem interface 26 is used to convert the signal at node 25 which is outputted by modem 24 into a signal that is compatible with cellular phone 28. Also, modem interface 26 converts the signal outputted by cellular phone 28 at node 27 into a signal that is compatible with modem 24. For instance, when computer host 22 tries to dial a number, modem 24 produces a tone dialing signal at node 25. However, cellular phone 28 cannot accept the tone dialing signal as an input. Thus, modem interface 26 converts the tone dialing signal into another form that can be received by cellular phone 28.

In FIG. 2, modem 24 can be made internal or external to computer host 22. Modem interface 26 can be an external device or an internal device built into modem 24 or cellular phone 28.

FIG. 3a is a detailed block diagram of modem 24, modem interface 26 and cellular phone 28 of FIG. 2. Modem 24 includes a system control A 43, a host interface 42, a data pump 44, a digital-to-analog (D/A) and analog-to-digital (A/D) converter 45, and a data access arrangement (DAA) 46. System control A 43 controls and operates host interface 42, data pump 44, D/A & A/D converter 45 and DAA 46. Data pump 44 modulates data coming from computer host 22 of FIG. 2 and demodulates signals coming from cellular phone 28. The D/A is used to convert digital signals from data pump 44 into analog signals, and the A/D is used to convert analog signals coming from cellular phone 28 into digital signals for data pump 44. DAA 46 is used as a protective connecting device that serves as an interface between D/A & A/D converter 45 and modem interface 26.

Cellular phone 28 in FIG. 3a includes a system control B 53 for controlling and operating the components in cellular phone 28—an analog cellular transceiver 50 and a radio transceiver 52. To send data, analog cellular transceiver 50 receives analog signals from modem interface 26, processes the signals in an analog domain and generates signals that can be converted into radio waves. To receive data, radio transceiver 52 receives radio waves, converts the radio waves into analog signals so that analog cellular transceiver 50 can process them in the analog domain.

The wireless communication system shown in FIG. 3a has several disadvantages. First, because the wireless communication system uses an analog cellular transceiver whose characteristics are optimized for voice communication but not for data communication, the data communication rate is low. Second, because a signal conversion (i.e., analog-to-digital or digital-to-analog) occurs between two signal processing units (data pump 44 and analog cellular transceiver 50), signals tend to degrade, reducing performance. Ideally, all signals should be processed in one domain (e.g., either digital or analog), and be converted into another form either at the beginning or at the end of the signal processing to avoid signal degradation. In the system shown in FIG. 3a, to send data, data pump 44 processes digital signals, D/A & A/D converter 45 converts the digital signals into analog signals, and analog cellular transceiver 50 processes the analog signals that are degraded. When signals are converted from a digital to an analog form (or from an analog to a digital form), the signals become degraded because the conversion process loses some information in the signals, and noise is injected into the signals. When the degraded signals are processed further, they may further reduce performance. Third, because modem 24 and cellular phone 28 operate under two separate system controls, modem 24 cannot adapt to dynamic changes that occur in cellular phone 28, and cellular phone 28 cannot adapt itself to the changes that occur in modem 24. A wireless communication system shown in FIG. 3a which is connected to an AMPS cellular network allows only the modem analog data and the emulated PSTN type information (ringing, busy, etc.) to be transferred between modem 24 and cellular phone 28. In effect, modem 24 sees the cellular telephone channel as a landline telephone channel. In addition, currently existing cellular protocols such as MNP10 and ETC are blind to the dynamic characteristics of the cellular telephone channel.

FIG. 3b is a detailed block diagram of modem 24, modem interface 26 and cellular phone 28 of FIG. 2. Modem 24 includes a system control A 63, a host interface 62, a data pump 64, a digital-to-analog (D/A) and analog-to-digital (A/D) converter 65, and a data access arrangement (DAA) 66.

Cellular phone 28 in FIG. 3b includes a system control B 73 for controlling and operating the components in cellular phone 28—an analog-to-digital (A/D) and digital-to-analog (D/A) converter 70, a digitally implemented cellular transceiver 72, a digital-to-analog (D/A) and analog-to-digital (A/D) converter 74, and a radio transceiver 76.

A prior art wireless communications system shown in FIG. 3b is similar to the one shown in FIG. 3a except that it uses a digitally implemented cellular transceiver 72 instead of an analog cellular transceiver. Because cellular transceiver 72 is digital, it may process signals more accurately than analog cellular transceiver 50. However, because the wireless communication system uses digital implementation, the system requires two extra A/D & D/A converters. Thus, the system in FIG. 3b may require more hardware than the system shown in FIG. 3a. The system in FIG. 3b has similar disadvantages as the one shown in FIG. 3a. Because of D/A & A/D converters 65 and 70, digitally implemented cellular transceiver 72 receives and processes degraded signals. Data degradation may be greater in this instance because the system requires two conversions to send signals from data pump 64 to digitally implemented cellular transceiver 72. In addition, like the system in FIG. 3a, the system in FIG. 3b includes two system control units: system control A 63 for modem 24 and system control B 73 for cellular phone 28. Because modem 24 and cellular phone 28 are controlled by two separate system controls, as described before, modem 24 cannot adapt to the dynamic changes that occur in cellular phone 28, and cellular phone 28 cannot adapt to the changes that occur in modem 24.

It will be advantageous, therefore, to provide a wireless communication system (a) having one system control unit for all the components of the system so that the various components of the system can be adapted and adjusted as the parameters of the other components or the dynamic characteristics of the cellular channel vary and (b) performing all of the signal processing in one domain to reduce signal degradation. In the present invention, a wireless communication system operating under one system control unit provides a way to implement advanced protocols that take advantage of control channel information and messages that are passed between a base station and a cellular transceiver.

BRIEF SUMMARY OF THE INVENTION

The present invention provides an integrated cellular data/voice communication system wherein all of the components are operated under a single system control unit so that the various components of the system can be adapted and adjusted as the parameters of the other components or the dynamic characteristics of the cellular channel change.

The cellular communication system of the present invention includes: (a) a data pump for performing modem signal processing; (b) a cellular transceiver communicatively coupled to the data pump for performing cellular signaling protocols and signal conditioning; (c) a digital-to-analog (D/A) and analog-to-digital (A/D) converter communicatively coupled to the cellular transceiver; (d) a radio transceiver communicatively coupled to the D/A & A/D converter for transmitting and receiving control commands and radio waves; (e) a host interface for interfacing the data pump to a computer host; and (f) a single system control unit for controlling the host interface, the data pump, the cellular transceiver, the D/A & A/D converter, and the radio transceiver so that the host interface, the data pump, the cellular transceiver, the D/A & A/D converter, and the radio transceiver operate under a single operating system, or a real time sequencer.

In one embodiment, both the cellular transceiver and the data pump operate in a digital domain without having a digital-to-analog or analog-to-digital conversion occurring between the two units. The data pump, cellular transceiver and system control unit may be in a single digital signal processing (DSP) chip, in a single microprocessor chip, or in a plurality of DSP or microprocessor chips.

The cellular communication system may also include an audio trait having (a) a microphone for converting first acoustic waves into a first signal, (b) a speaker for converting a second signal to second acoustic waves, and (c) an encoder and a decoder (CODEC) unit communicatively coupled to the microphone, the speaker and the cellular transceiver for converting the first signal into a third signal and transmitting the third signal to the cellular transceiver, and for converting a fourth signal received from the cellular transceiver into the second signal. The CODEC unit may implement a non-linear conversion function or a linear conversion function.

The cellular transceiver includes a signal conditioning block having filters, pre-emphasis/de-emphasis units, and compression and expansion units whose characteristics are adjustable depending on whether they are processing audio signals or data signals.

BRIEF DESCRIPTION OF THE DRAWINGS

The objects, features and advantages of the present invention will be apparent form the following detailed description wherein:

FIG. 1 is a block diagram of a prior art data communications network system for a wired telephone network.

FIG. 2 is a block diagram of a prior art wireless communications network system.

DETAILED DESCRIPTION OF THE INVENTION

The present invention provides methods and apparatus for implementing a wireless communication system that allows all of the system's components to operate under one system control unit so that the various components can adjust and adapt to the changes that occur in other components and that improves the efficiency of communication over the wireless communications network. In the following detailed description, numerous specific details are set forth such as detailed block diagrams and signal flow charts to provide a thorough understanding of the present invention. It will be appreciated, however, by one having ordinary skill in the art that the present invention may be practiced without such specific details. In other instances, well-known control structures and gate level circuits have not been shown in detail so as not to obscure the present invention. Those of ordinary skill in the art, once provided with the various functions below, will be able to implement the necessary logic circuits without undue experimentation.

Figure 3A:
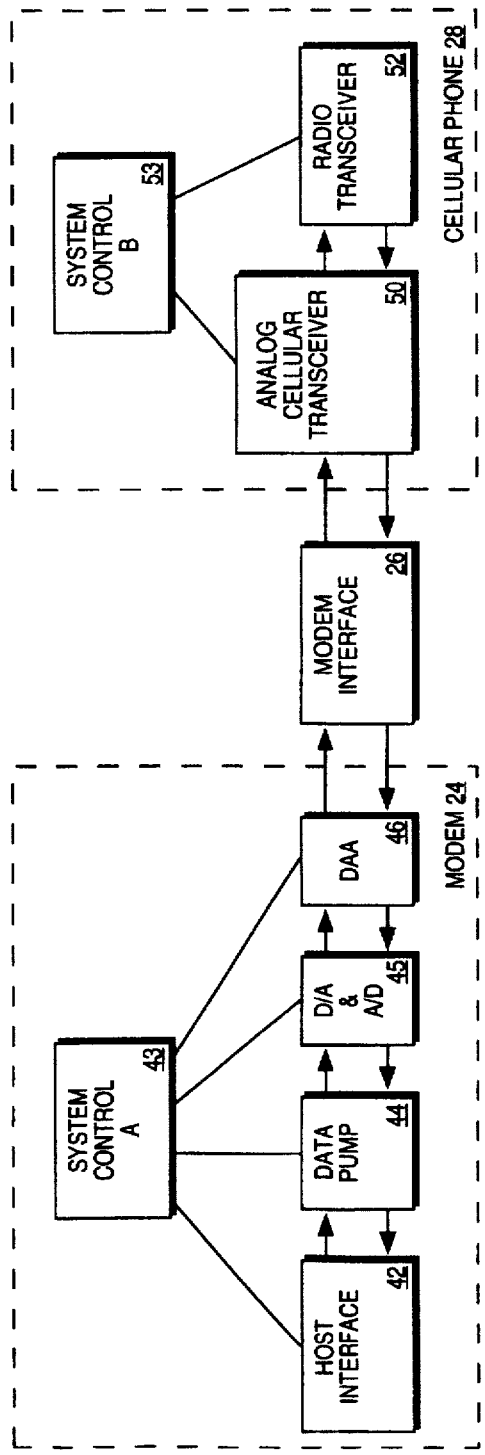
FIG. 3a is a detailed block diagram of a portion of the wireless communications network system shown in FIG. 2 having an analog cellular transceiver.
Figure 3B:
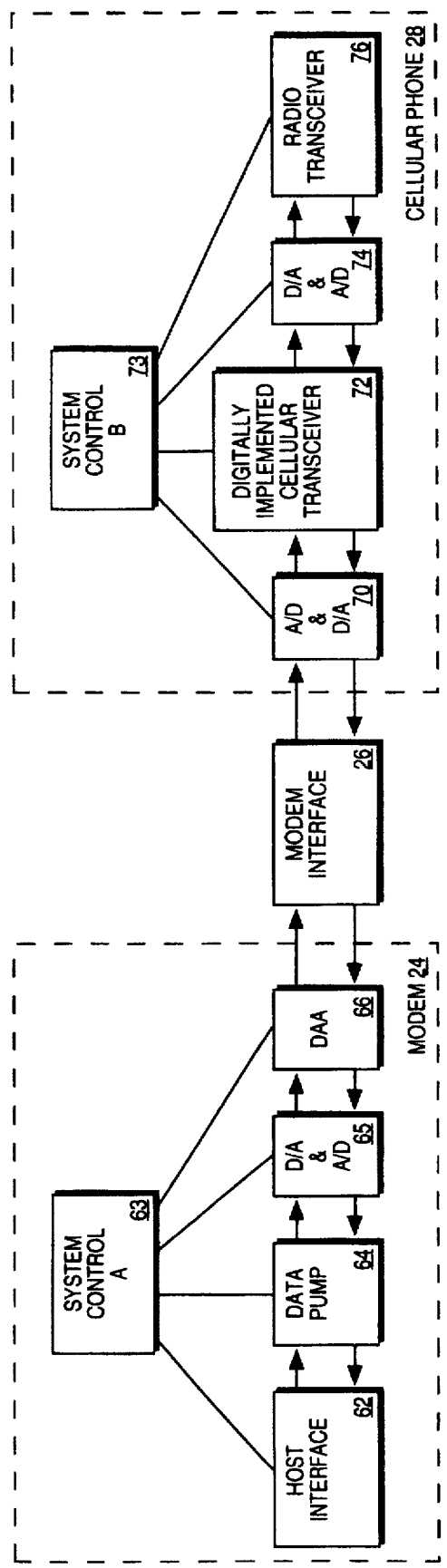
FIG. 3b is a detailed block diagram of a portion of the wireless communications network system shown in FIG. 2 having a digitally implemented cellular transceiver.
Figure 4:
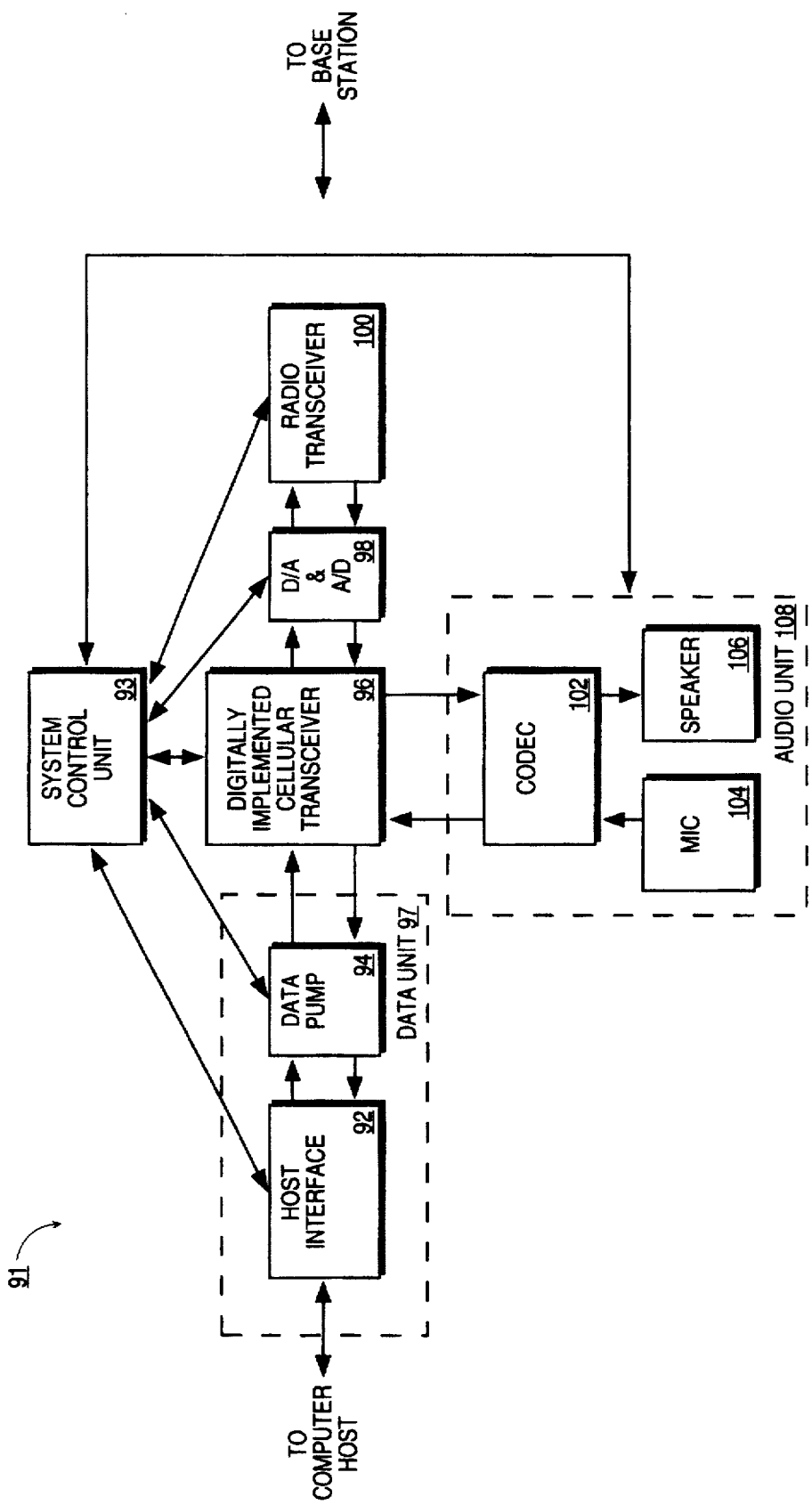
FIG. 4 is a digital wireless communication system operating under one system control unit according to the present invention.

Now referring to FIG. 4, a wireless communication system 91 is presented according to the present invention. Wireless communication system 91 includes a system control unit 93 for controlling various components of wireless communication system 91 and a data unit 97 for processing data signals received from a computer host or data signals received from a digitally implemented cellular transceiver 96. Wireless communication system 91 further includes an audio unit 108 for processing audio signals that are received from digitally implemented cellular transceiver 96 or that are to be transmitted to digitally implemented cellular transceiver 96. Digitally implemented cellular transceiver 96 receives data signals from data unit 97 or audio signals from audio unit 108. D/A & A/D converter 98 includes a D/A circuitry and an A/D circuitry. The D/A circuitry is used to convert signals in a digital domain into analog cellular signals. The A/D circuitry is used to convert analog cellular signals received from radio transceiver 100 into digital signals. Radio transceiver 100 is used to either transmit radio waves to a base station or to receive radio waves from the base station utilizing two different types of channels-control channels and voice channels.

Figure 5:
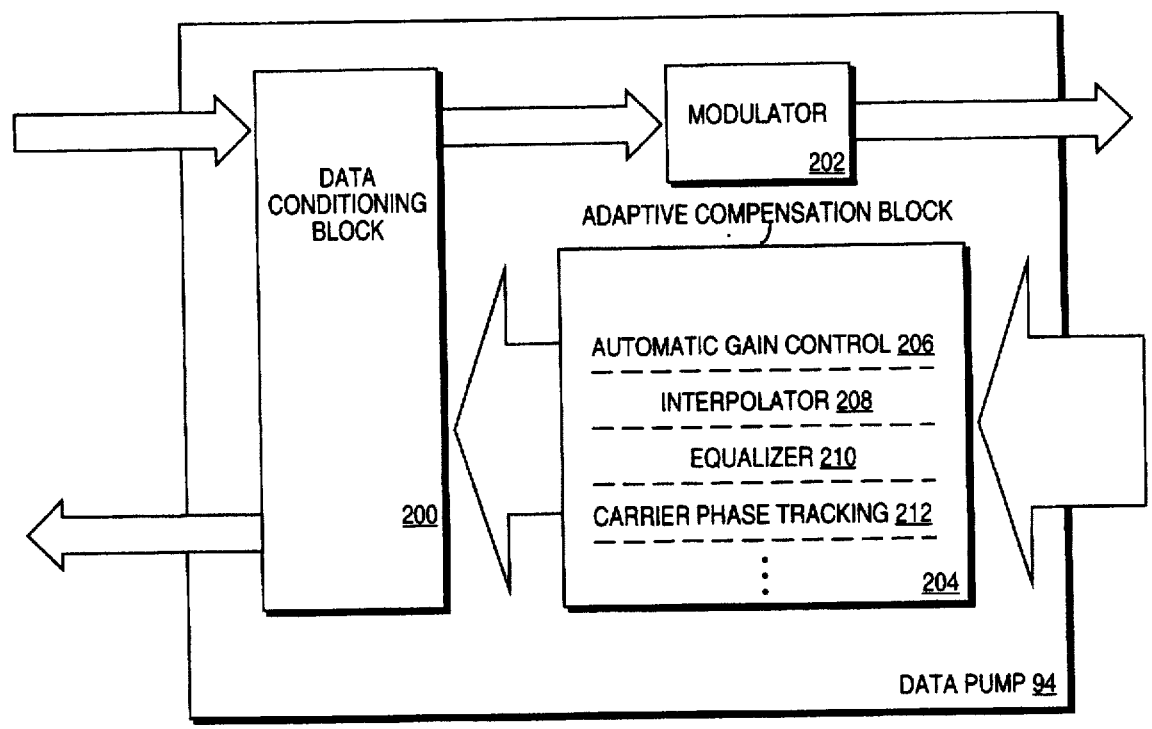
FIG. 5 is a detailed block diagram of the data pump of FIG. 4.

Data unit 97 includes a host interface 92 for interfacing wireless communication system 91 to a data terminal equipment (DTE) such as a computer host and a data pump 94 for performing modem signal processing. Referring to FIG. 5, a high speed modem data pump 94 typically contains a data conditioning block 200, a modulator 202 and an adaptive compensation block 204. Adaptive compensation block 204 performs adaptive receiver algorithms that adjust the parameters of data pump 94 so that the parameters can be optimally matched to the characteristics of a remote modem and transmission channel. The adaptive receiver algorithms used in data pump 94 may include functional blocks such as an automatic gain control 206, a timing interpolator 208, an equalizer 210, carrier phase tracking 212, etc. A demodulator function for data pump 94 can be included in any of the functional blocks mentioned above (e.g., automatic gain control 206, timing interpolator 208, equalizer, and carrier phase tracking 212) or may be implemented as a separate functional block in 204.

Automatic gain control 206 compensates for the different signal levels arriving at the data pump input, and presents reasonably stable input levels to the other functional blocks in 204. Very often the timing frequencies of a remote modem's data pump in a transmission mode and the local modem's data pump in a reception mode are slightly different, and timing interpolator 208 may need to adaptively adjust the local timing so that it is identical to the remote timing. Equalizer 210 adaptively compensates for the transmission channel amplitude and delay distortions. Carrier phase tracking 212 adaptively corrects errors that occur due to the differences between the local modem's data pump timing and the carrier frequency timing of the remote modem's data pump.

Audio unit 108 includes a microphone 104, a speaker 106 and an encoder/decoder (CODEC) unit 102. Microphone 104 receives acoustic waves and converts them into electrical audio signals. Speaker 106 receives electrical audio signals, converts them into acoustic waves and transmits the acoustic waves into the air. CODEC unit 102 is used to encode or decode signals using a non-linear conversion function such as the m-law or A-law or a linear conversion function.

Digitally implemented cellular transceiver 96 processes either digital data signals or audio signals. Because digitally implemented cellular transceiver 96 processes signals in the digital domain, no D/A & A/D converter is required between data unit 97 and digitally implemented cellular transceiver 96. Because there is no digital to analog conversion between data unit 97 and digitally implemented cellular transceiver 96, there is less degradation in signal quality.

Figure 6:
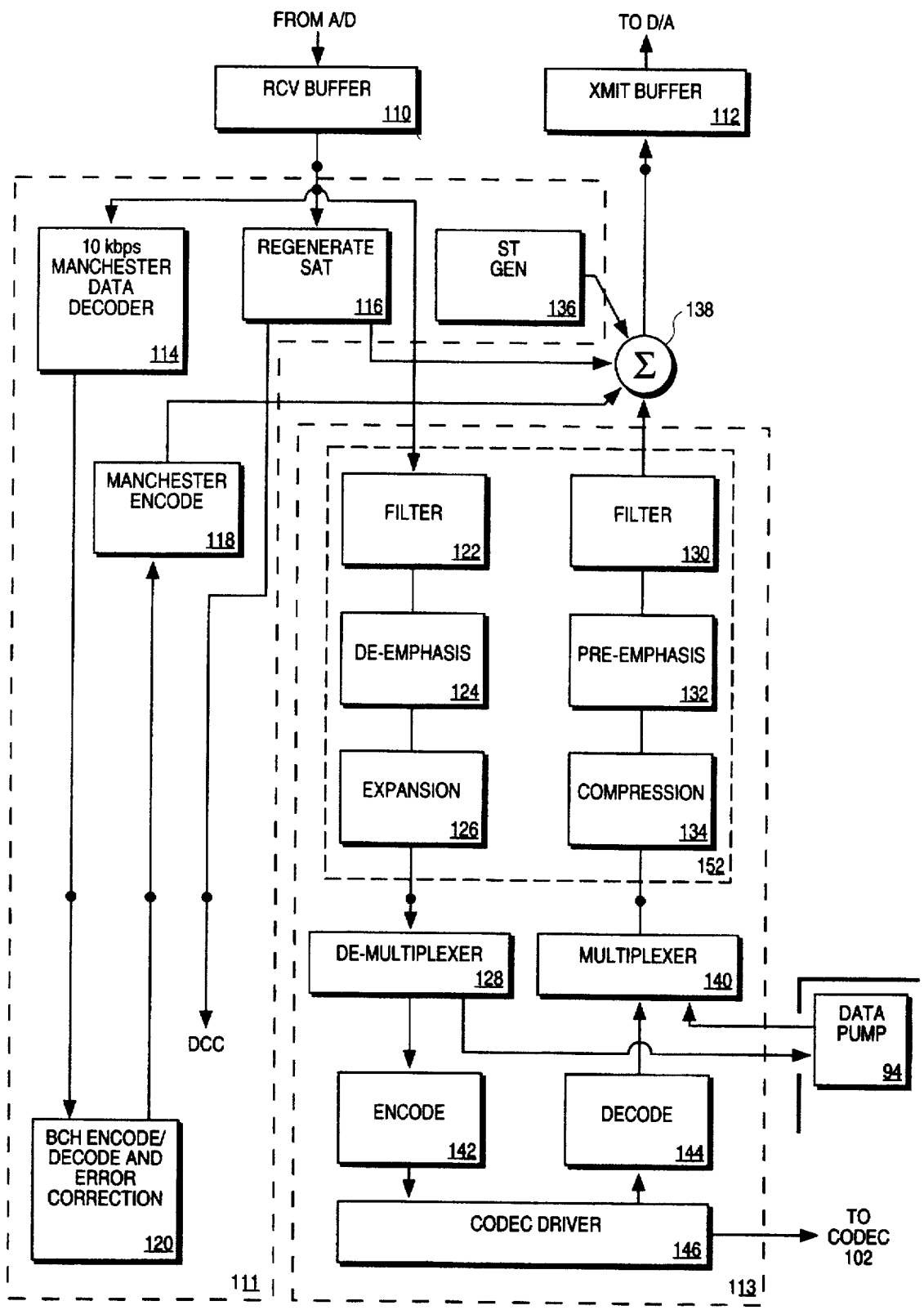
FIG. 6 is a block diagram of the digitally implemented cellular transceiver of FIG. 4.

Now referring to FIG. 6, digitally implemented cellular transceiver 96 includes a first block 111 that performs cellular signaling protocols to communicate with the base station and a second block 113 that performs signal conditioning to communicate with a remote unit through the base station. First block 111 includes a signaling tone (ST) generator (136), regenerator (SAT) (116), 10 kbps Manchester Data Decoder (114) and Encoder (118), and a BCH Encoder/Decoder and Error Corrector (120). In the first block 111, digitally implemented cellular transceiver 96 processes various cellular signaling protocols such as dotting patterns, signaling tone (ST) generation, signaling pattern detection and generation, and manchester coding/decoding. Digitally implemented cellular transceiver 96 also handles other cellular signaling protocols such as controlling different phases of call establishment, hand-offs, and termination. It should be noted that digitally implemented cellular transceiver 96 may process other cellular signaling protocols not listed above. All cellular signaling protocols are implemented on the same digital processor, or they run as a group of tasks under the same operating system or scheduler. While digitally implemented cellular transceiver 96 directs, generates and processes the cellular protocols, system control unit 93 determines when to send the signals and what to do with the signals.

In the second block 113, digitally implemented cellular transceiver 96 includes a CODEC driver 146 for interfacing the software functions of digitally implemented cellular transceiver 96 to CODEC unit 102. If CODEC unit 102 uses a non-linear conversion function, then an encoder 142 and a decoder 144 are implemented in digitally implemented cellular transceiver 96. Decoder 144 is used to convert the non-linear signals encoded by CODEC unit 102 into linear signals. Encoder 142 is used to convert linear signals coming from a demultiplexer 128 into non-linear signals. If, on the other hand, CODEC unit 102 uses a linear conversion function, then encoder 142 and decoder 144 are not needed. The advantage of having a non-linear CODEC unit 102 is that it is generally inexpensive. In the present invention, the disadvantage of having a non-linear CODEC unit is that it requires extra hardware: encoder 142 and decoder 144. In addition, signals get degraded when encoder 142 or decoder 144 converts the signals from one form to another.

The second block 113 further includes a multiplexer 140, a compression unit 134, a pre-emphasis unit 132, a first filter 130, a second filter 122, a de-emphasis unit 124, an expansion unit 126 and the de-multiplexer 128. Multiplexer 140 selects either the data signal from data pump 94 or the audio signal from decoder 144 (or CODEC driver 146 if CODEC unit 102 is linear). Compression unit 134 manipulates a signal based on its amplitude and is adjustable (or is software programmable) in that its characteristics can be adjusted depending on whether it receives audio signals or data signals.

Figure 7A:
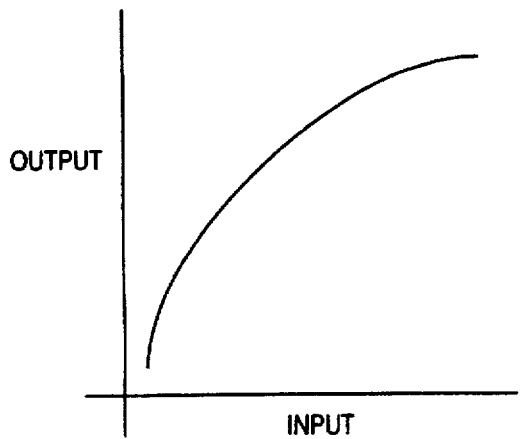
FIG. 7a is a graph showing the relationship between an input and an output of a compression function used for audio signals.

FIG. 7a shows one exemplary graphical relationship between an input and an output of compression unit 134 where the input is an audio signal. Compression unit 134 decreases the magnitude of the input signal if the amplitude of the input signal is low. On the other hand, compression unit 134 increases the magnitude of the input signal if the amplitude of the input signal is high.

Figure 7B:
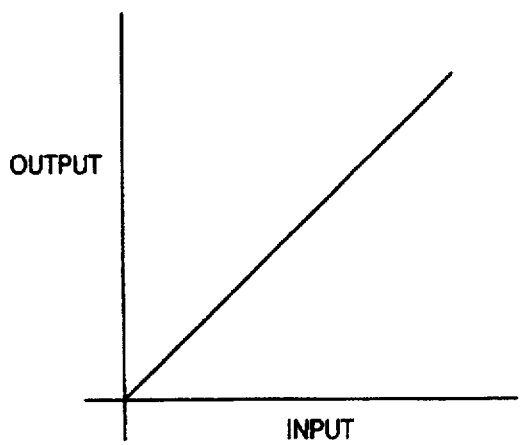
FIG. 7b is a graphical relationship between an input and an output of a compression function used for data signals according to the present invention.

FIG. 7b shows one exemplary transfer function employed by compression unit 134 where the input is a data signal. In this instance, compression unit 134 uses a linear transfer function between the input and the output.

Referring back to FIG. 6, pre-emphasis unit 132 is used to manipulate a signal based on its frequency. Pre-emphasis unit 132 is also adjustable (or is software programmable) in that its characteristics may be varied depending on whether it receives audio signals from the audio unit or data signals from the data unit. First filter 130 is used to band-limit a signal before it is sent to a transmit buffer 112 that is coupled to the D/A circuitry in D/A & A/D converter 98. First filter 130 is typically a band-pass filter. Second filter 122 is used to receive a signal from a receiver buffer 110 which is coupled to the A/D circuitry of D/A & A/D converter 98. The characteristics of both first and second filters (130 and 122) can be adjusted depending on whether an audio or data signal is being processed.

De-emphasis unit 124 manipulates a signal based on its frequency in a manner opposite to pre-emphasis unit 132. De-emphasis unit 124 is also adjustable (or is software programmable) like pre-emphasis unit 132. Expansion unit 126 manipulates a signal based on its amplitude in a manner opposite to compression unit 134. Expansion unit 126, in effect, is used to undo what a compression unit does. Expansion unit 126 is also adjustable (or is software programmable) depending on the type of input signal.

Figure 8A:
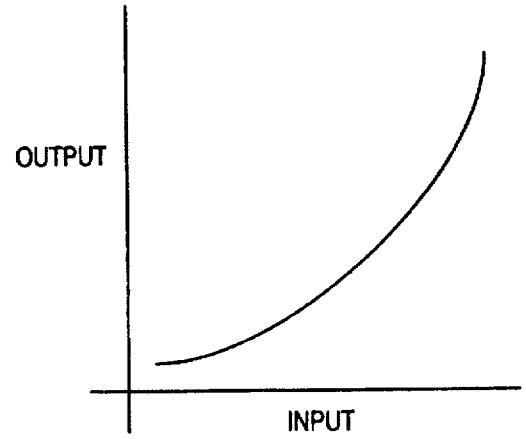
FIG. 8a is a graph illustrating the relationship between an input and an output of an expansion function used for audio signals.

FIG. 8a shows a typical graphical relationship between an input and an output of an expansion unit used for audio signals. The transfer function of FIG. 8a is substantially an inverse function of that shown in FIG. 7a. The transfer function shown in FIG. 8a increases the amplitude of its input signal if its amplitude is low, and decreases the amplitude of its signal if its amplitude is high.

Figure 8B:
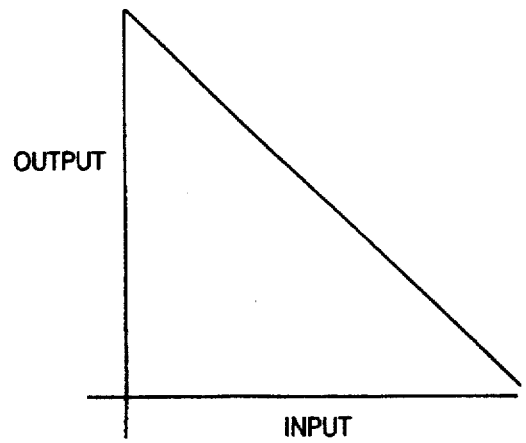
FIG. 8b is a graphical relationship between an input and an output of an expansion function used for data signals according to the present invention.

FIG. 8b is a typical transfer function employed by expansion unit 126 for data signals. The transfer function of FIG. 8b is substantially an inverse function of that shown in FIG. 7b. In this example, a linear function is employed for expansion unit 126.

De-multiplexer 128 is used to direct signals received from a single input to either data pump 94 or encoder 142 (or CODEC driver 146 if CODEC unit 102 is linear).

It should be noted that the reason why the functional units in block 152 (i.e., 122, 124, 126, 130, 132 and 134) can be adjusted (or is programmable) depending on whether block 152 is processing audio or data signals is that system control unit 93 in FIG. 4 controls all of data unit 97, audio unit 108 and digitally implemented cellular transceiver 96. System control unit 93 knows what type of signal is sent and received by various components, and it can adjust the characteristics of the components accordingly.

Referring to FIG. 4, in another embodiment, digitally implemented cellular transceiver 96 may be replaced by an analog cellular transceiver. In that instance, D/A & A/D converter 98 is no longer needed. However, a D/A & A/D converter is needed between data pump 94 and digitally implemented cellular transceiver 96 so that during data transmission, the digital signals from data pump 94 can be first converted into analog signals before entering into the analog cellular transceiver, and during data reception, the analog signals from the analog cellular transceiver can be converted into digital signals before the signals are sent to data pump 94. As described before, it is preferable to place a D/A & A/D converter either at the beginning or at the end of all signal processing. When the D/A & A/D converter is placed between two signal processing units (i.e., data pump 94 and the analog cellular transceiver), the signal quality deteriorates. Thus, an analog cellular transceiver is typically inferior in performance to a digitally implemented cellular transceiver.

The components such as data unit 97, digitally implemented cellular transceiver 96 and system control unit 93 may be in one digital signal processing (DSP) chip, in one microprocessor chip, in a plurality of DSP chips or in a plurality of microprocessor chips. Whether wireless communication system 91 uses a single chip or several chips, there will be only one system control unit so that all the components can operate under one operating system. Because the components such as data unit 97, audio unit 108 and digitally implemented cellular transceiver 96 are integrated and operate under one operating system, information can be passed between different components. Also, one component can adapt itself to the changes that occur in another component. For example, data pump 94 can adapt to impairments of the cellular line. Like a regular phone line, the cellular line can also have imperfection or distortions. When the characteristics of the control channels or the voice channels of the cellular Line change, because system control unit 93 controls both data pump 94 and digitally implemented cellular transceiver 96, data pump 94 can modify its parameters to compensate for the distortion that occurs in the cellular line. Thus, because the various components are integrated and operate under one operating system, wireless communication system 91 can achieve a higher transmission rate and/or lower error rate. Also, because the present invention is integrated, wireless communication system 91 can be put in one package, and the package can be much smaller than any of the conventional wireless communication system packages.

Figure 9A:
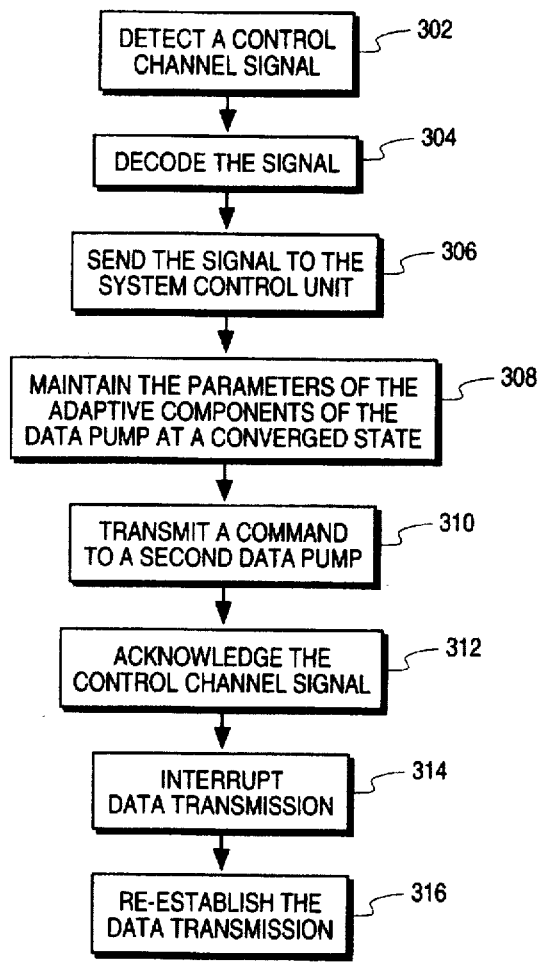
FIG. 9a is a flow chart illustrating one method of using control channel information to enhance data throughput of a wireless communication system according to the present invention.

FIG. 9a shows a flow chart illustrating one method of using control channel information to enhance data throughput of a wireless communication system according to the present invention. Now referring to FIGS. 9a, 4 and 6, at step 302, digitally implemented cellular transceiver 96 detects a control channel signal indicating that a channel interruption is to occur. The control channel signal includes a dotting pattern and control channel message. At step 304, Manchester data decoder 114 decodes the control channel signal. At step 306, the decoded control channel signal is sent to system control unit 93.

At step 308, system control unit 93 controls the parameters of the adaptive components of data pump 94 so that the parameters remain at a converged state. The adaptive components include, but are not limited to, an equalizer, a carrier phase tracking unit, an interpolator and an automatic gain control unit. In the present invention, while there is no channel interruption, the parameters of the adaptive components are continuously adjusted to adapt to the dynamic changes that occur in the communication channel. Conventionally, when there is a channel interruption (e.g., a line drop), the parameters of the adaptive components are lost. When the channel is re-connected, the adaptive components may have to be completely re-trained. In the present invention, however, because there is only one system control unit (system control unit 93) controlling all of the components (97, 96, 98, 100 and 108), when there is a channel interruption, system control unit 93 can command the adaptive components of data pump 94 to remain at its converged state (i.e., the last state before the channel interruption) so that when the channel is re-connected, because the adaptive components are at the last converged state, it would take less time to re-train the components. During steps 302, 304 and 306, the parameters of the adaptive components are continuously adjusted. During steps 308, 310, 312 and 314, the parameters are maintained at the last converged state.

At step 310, system control unit 93 may send a command to a data pump of a second modem so that the second modem can initiate an appropriate process to maintain the parameters of the adaptive components of the second modem at a converged state. At step 312, system control unit 93 sends an acknowledgment of the control channel signal to the base station. It should be noted that steps 310 and 312 are optional and thus need not be executed, if so desired. At step 314, the channel is interrupted, and data transmission stops. After detecting the control channel signal at step 302, digitally implemented cellular transceiver 96 has about 100 msec to perform the steps 304–312 before the channel is interrupted. At step 316, the channel is re-established so that the data can be transmitted again. Because the parameters of the adaptive components of the data pump were at the last converged state, the amount of time required to re-train the adaptive components is reduced.

Figure 9B:
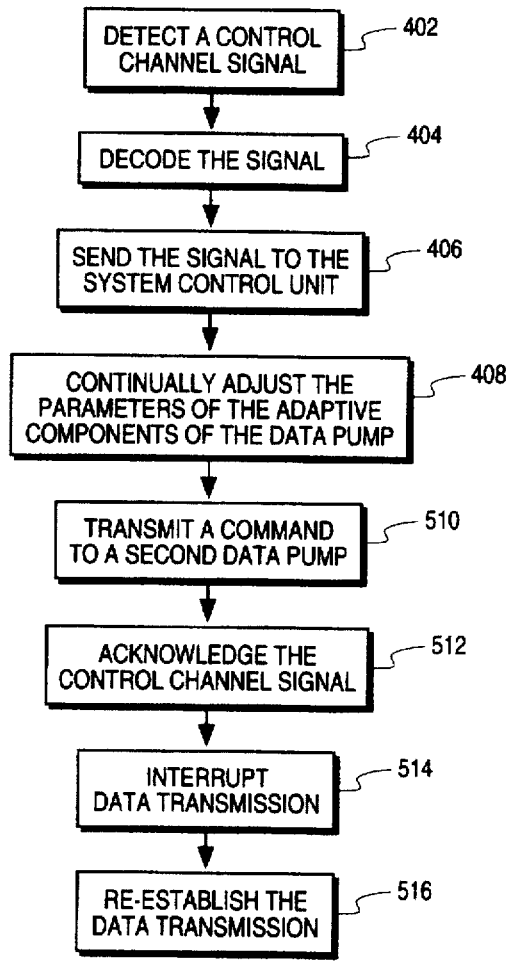
FIG. 9b is a flow chart illustrating another method of using control channel information to enhance data throughput of a wireless communication system according to the present invention.

FIG. 9b shows a flow chart illustrating another method of using control channel information to enhance data throughput of a wireless communication system according to the present invention. Now referring to FIG. 9b, the steps 402–406 and 510–516 are the same as the steps 302–306 and 310–316 of FIG. 9a, and thus the descriptions are not repeated. At step 408, instead of merely having the parameters of the adaptive components remain at the last converged state, the parameters can be continuously adjusted throughout the channel interruption period so that when the channel is re-established, data pump 94 need not be re-trained. The wireless communication system 91 may track the rate of parameter variations in the adaptive components of data pump 94 and/or maintain the adaptive variations at the tracked rate (e.g., tap update, frequency offsets, etc.). The parameters of the adaptive components are adjusted during steps 402–516.

Figure 10:
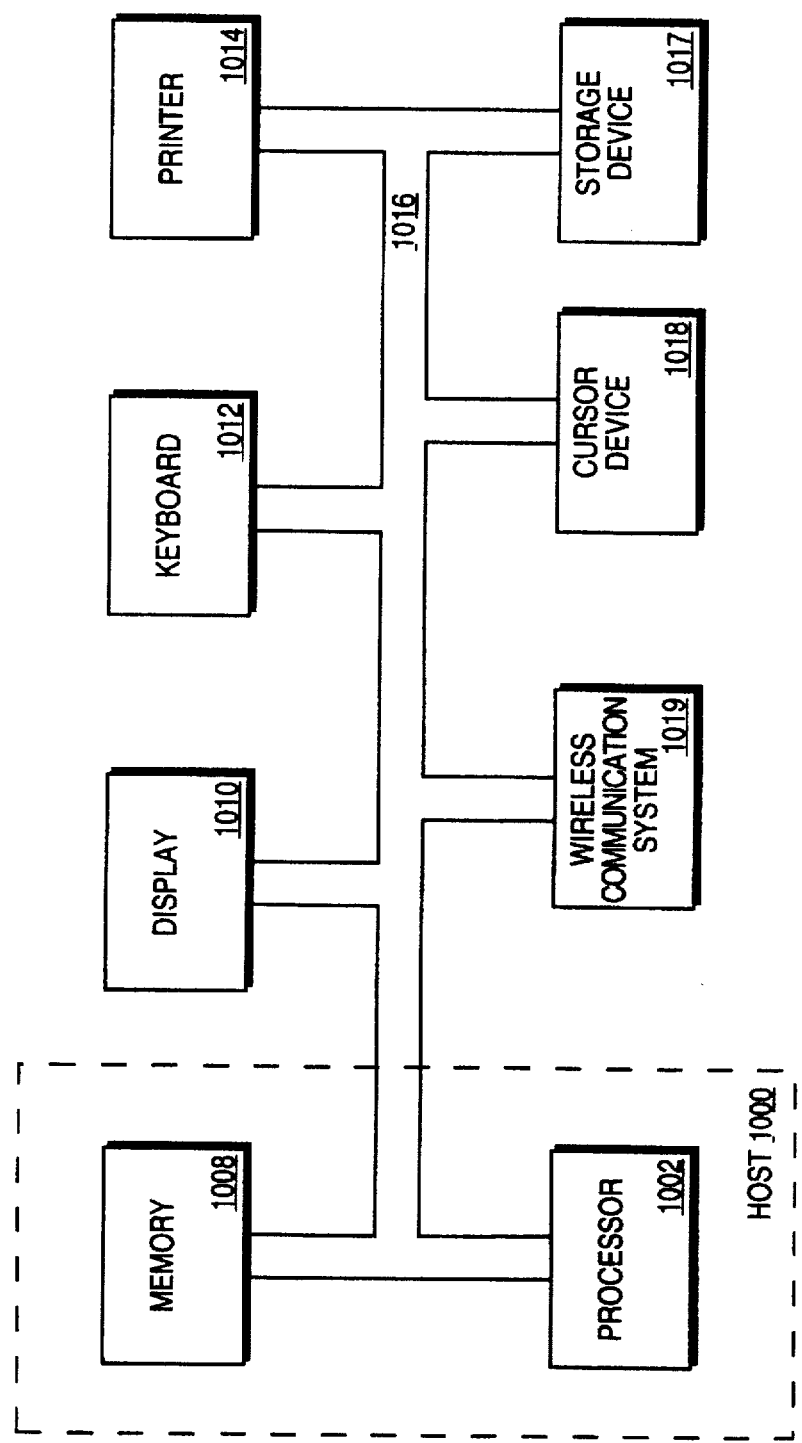
FIG. 10 is a computer system that may utilize a wireless communication system in accordance with the present invention.

FIG. 10 shows a computer system that may utilize a wireless communication system in accordance with the present invention. A computer host 1000 includes a memory 1008 and a central processor 1002. Memory 1008 and central processor 1002 are those typically found in most general purpose computer and almost all special purpose computers. In fact, these devices contained within computer host 1000 are intended to be representative of the broad category of data processors and memory. Many commercially available computers having different capabilities may be utilized in the present invention.

A system bus 1016 is provided for communicating information. A display device 1010 utilized with the computer system of the present invention may be a liquid crystal device, cathode ray tube or other display device suitable for creating graphic images and/or alphanumeric characters recognizable to a user. The computer system may also include an alphanumeric input device 1012 including alphanumeric and function keys coupled to bus 1016 for communicating information and command selections to central processor 1002, and a cursor control device 1018 coupled to bus 1016 for communicating user input information and command selections to central processor 1002 based on a user's hand movement. Cursor control device 1018 allows the user to dynamically signal the two-dimensional movement of the visual symbol (or cursor) on a display screen of display device 1010. Many implementations of cursor control device 1018 are known in the art, including a track ball, mouse, pen, joystick or special keys on the alphanumeric input device 1012, all capable of signaling movement in a given direction or manner of displacement.

The computer system of FIG. 10 also includes a wireless communication system 1019 of the present invention coupled to bus 1016 for communicating data to and from computer host 1000. Wireless communication system 1019 may implement the system shown in FIG. 4. Also available for interface with the computer system of the present invention is a data storage device 1017 such as a magnetic disk or optical disk drive, which may be communicatively coupled with bus 1016, for storing data and instructions. The computer system of FIG. 10 may also include a printer for outputting data.

While the present invention has been particularly described with reference to the various figures and embodiments, it should be understood that these are for illustration only and should not be taken as limiting the scope of the invention. Many changes and modifications may be made to the invention, by one having ordinary skill in the art, without departing from the spirit and scope of the invention.

What is claimed is:

1. An integrated cellular communication system which communicates with a remote modem by radio waves through a base station and a telephone network, said integrated cellular communication system comprising:

a data pump having parameters for performing modem signal processing, said data pump having an adaptive component that adjusts said parameters of said data pump to match the characteristics of said remote modem and said integrated cellular communication system;

a cellular transceiver communicatively coupled to said data pump for performing cellular signaling protocols and signal conditioning;

a radio transceiver communicatively coupled to said cellular transceiver for transmitting and receiving control commands and radio waves; and a single system control unit communicatively coupled to said data pump, said cellular transceiver, and said radio transceiver, said single system control unit for controlling said data pump, said cellular transceiver, and said radio transceiver so that said data pump, said cellular transceiver, and said radio transceiver operate under a single operating system.

2. An integrated cellular communication system according to claim 1 wherein said data pump, said cellular transceiver and said system control unit are implemented in a single digital signal processing (DSP) chip or in a single microprocessor chip.

3. An integrated cellular communication system according to claim 1 wherein said operating system allows said data pump to adapt itself to changes that occur in said cellular transceiver and allows said cellular transceiver to adapt itself to changes that occur in said data pump.

4. An integrated cellular communication system according to claim 1 wherein said data pump is directly coupled to said cellular transceiver.

5. An integrated cellular communication system according to claim 1 which does not require a D/A and A/D converter, a data access arrangement or a modem interface between said data pump and said cellular transceiver.

6. An integrated cellular communication system according to claim 1 wherein said cellular transceiver is programmed to receive and process a data signal from said data pump in one mode and to receive and process an audio signal in another mode.

7. An integrated cellular communication system according to claim 1 wherein both said data pump and said cellular transceiver operate in one domain, and no digital-to-analog or analog-to-digital domain conversion occurs between said data pump and said cellular transceiver.

8. An integrated cellular communication system according to claim 7 wherein said data pump and said cellular transceiver both operate in a digital domain.

9. An integrated cellular communication system according to claim 1 further including:
 a host interface for interfacing said data pump to a computer host, said host interface controlled by said system control unit; and
 a digital-to-analog (D/A) and analog-to-digital (A/D) converter communicatively coupled between said cellular transceiver and said radio transceiver;
 wherein said cellular transceiver is a digitally implemented cellular transceiver; and
 wherein said system control unit controls said host interface and said D/A and A/D converter so that said host interface and said D/A and A/D converter operate under said single operating system.

10. An integrated cellular communication system according to claim 9 further including:
 a microphone for converting first acoustic waves into a first signal;
 a speaker for converting a second signal to second acoustic waves; and
 an encoder and decoder (CODEC) unit communicatively coupled to said microphone, said speaker and said cellular transceiver, said CODEC unit for converting said first signal into a third signal and transmitting said third signal to said cellular transceiver, and for converting a fourth signal received from said cellular transceiver into said second signal.

11. An integrated cellular communication system according to claim 3 wherein said cellular transceiver includes:
 (a) a signal conditioning block comprising:
 a CODEC driver for interfacing said CODEC unit to a multiplexer, said CODEC driver for converting said third signal into a fifth signal, said multiplexer for selecting one of a first data signal from said data pump and said fifth signal from said CODEC driver as an input and for outputting a sixth signal;
 adjustable compression means for manipulating said sixth signal based on its amplitude and for outputting a seventh signal, said adjustable compression means that adjusts its characteristics depending on whether said sixth signal originated from said data pump or said CODEC unit;
 adjustable pre-emphasis means for manipulating said seventh signal based on its frequency and for outputting an eighth signal, said adjustable pre-emphasis means that adjusts its characteristics depending on whether said seventh signal originated from said data pump or said CODEC unit;
 a first adjustable filter for band-limiting said eighth signal and for outputting a ninth signal, said first adjustable filter that adjusts its characteristics depending on whether said eighth signal originated from said data pump or said CODEC unit;
 a transmit buffer coupled to said first adjustable filter and to said D/A and A/D converter;
 a receiver buffer coupled to said D/A and A/D converter;
 a second adjustable filter for removing unwanted components of a tenth signal received from said receiver buffer and for producing an eleventh signal, said second adjustable filter that adjusts its characteristics depending on whether said tenth signal is destined to said data pump or said CODEC unit;
 adjustable de-emphasis means for manipulating said eleventh signal based on its frequency and for outputting a twelfth signal, said adjustable de-emphasis means that adjusts its characteristics depending on whether said eleventh signal is destined to said data pump or said CODEC unit;
 adjustable expansion means for manipulating said twelfth signal based on its amplitude and for outputting a thirteenth signal, said adjustable expansion means that adjusts its characteristics depending on whether said twelfth signal is destined to said data pump or said CODEC unit; and
 a de-multiplexer coupled to said CODEC driver for receiving said thirteenth signal as an input and for outputting one of a second data signal for said data pump or a fourteenth signal; and
 (b) a cellular signaling protocol block coupled to said receiver buffer and said transmit buffer.

12. An integrated cellular communication system according to claim 10 wherein said cellular transceiver includes:
 (a) a signal conditioning block comprising:
 a CODEC driver for interfacing a second decoder to said CODEC unit, said CODEC driver for converting said fourth signal to a fifth signal, said second decoder for converting said fifth signal that is non-linear into a sixth signal that is linear;
 a multiplexer for selecting one of a first data signal from said data pump and said sixth signal from said second decoder as an input and for outputting a seventh signal;
 adjustable compression means for manipulating said seventh signal based on its amplitude and for outputting an eighth signal, said adjustable compression means that adjusts its characteristics depending on whether said seventh signal originated from said data pump or said CODEC unit;
 adjustable pre-emphasis means for manipulating said eighth signal based on its frequency and for outputting a ninth signal, said adjustable pre-emphasis means that adjusts its characteristics depending on whether said eighth signal originated from said data pump or said CODEC unit;
 a first adjustable filter for band-limiting said ninth signal and for outputting a tenth signal, said first adjustable filter that adjusts its characteristics depending on whether said ninth signal originated from said data pump or said CODEC unit;

a transmit buffer coupled to said first adjustable filter and to said D/A and A/D converter;

a receiver buffer coupled to said D/A and A/D converter;

a second adjustable filter for removing unwanted components of an eleventh signal received from said receiver buffer and for producing a twelfth signal, said second adjustable filter that adjusts its characteristics depending on whether said eleventh signal is destined to said data pump or said CODEC unit;

adjustable de-emphasis means for manipulating said twelfth signal based on its frequency and for outputting a thirteenth signal, said adjustable de-emphasis means that adjusts its characteristics depending on whether said twelfth signal is destined to said data pump or said CODEC unit;

adjustable expansion means for manipulating said thirteenth signal based on its amplitude and for outputting a fourteenth signal, said adjustable expansion means that adjusts its characteristics depending on whether said thirteenth signal is destined to said data pump or said CODEC unit;

a de-multiplexer for receiving said fourteenth signal as an input and for outputting one of a second data signal for said data pump or a fifteenth signal;

an encoder unit coupled to said CODEC driver for receiving said fifteenth signal and converting said fifteenth signal into a sixteenth signal wherein said CODEC unit uses a non-linear transfer function; and (b) a cellular signaling protocol block coupled to said receiver buffer and said transmit buffer.

13. A method of operating an integrated cellular communication system, which communicates with a remote modem by radio waves through a base station and a telephone network, under a single operating system, said system including a single system control unit coupled to a cellular transceiver, a radio transceiver, and a data pump having parameters, said data pump having an adaptive component that adjusts said parameters of said data pump to match the characteristics of said remote modem and said integrated cellular communication system, wherein said data pump coupled to said cellular transceiver, said transceiver coupled to said radio transceiver, said method comprising the steps of:

selecting a signal among an audio signal and a data signal under said operating system;

converting said signal into a cellular signal in a digital domain under said operating system without having a digital-to-analog domain conversion; and converting said cellular signal into radio waves under said operating system.

14. A method according to claim 13 wherein said step of converting said cellular signal into said radio waves comprises the steps of:

converting said cellular signal into an analog cellular signal under said operating system; and converting said analog cellular signal into said radio waves in an analog domain under said operating system.

15. A computer system comprising:

a memory for storing an instruction;

a system bus coupled to said memory to provide a data communication path for said computer system;

a processor coupled to said system bus for decoding said instruction; and an integrated cellular communication system which communicates with a remote modem by radio waves through a base station and a telephone network, said integrated cellular communication system coupled to said system bus including:

a data pump having parameters for performing modem signal processing, said data pump having an adaptive component that adjusts said parameters of said data pump to match the characteristics of said remote modem and said integrated cellular communication system;

a cellular transceiver communicatively coupled to said data pump for performing cellular signaling protocols and signal conditioning;

a radio transceiver communicatively coupled to said cellular transceiver for transmitting and receiving control commands and radio waves; and a single system control unit communicatively coupled to said data pump, said cellular transceiver, and said radio transceiver, said single system control unit for controlling said data pump, said cellular transceiver, and said radio transceiver so that said data pump, said cellular transceiver, and said radio transceiver operate under a single operating system.

16. A computer system according to claim 15 wherein said data pump, said cellular transceiver and said system control unit are implemented in a single digital signal processing (DSP) chip or in a single microprocessor chip.

17. A computer system according to claim 15 wherein said operating system allows said data pump to adapt itself to changes that occur in said cellular transceiver and allows said cellular transceiver to adapt itself to changes that occur in said data pump.

18. A computer system according to claim 15 wherein both said data pump and said cellular transceiver operate in one domain, and no digital-to-analog or analog-to-digital domain conversion occurs between said data pump and said cellular transceiver.

19. A computer system according to claim 18 wherein said data pump and said cellular transceiver both operate in a digital domain.

20. A computer system according to claim 15 wherein said integrated cellular communication system further includes:

a host interface for interfacing said data pump to a computer host, said host interface controlled by said system control unit; and a digital-to-analog (D/A) and analog-to-digital (A/D) converter communicatively coupled between said cellular transceiver and said radio transceiver;

wherein said cellular transceiver is a digitally implemented cellular transceiver; and wherein said system control unit controls said host interface and said D/A and A/D converter so that said host interface and said D/A and A/D converter operate under said single operating system.

21. A computer system according to claim 20 wherein said integrated cellular communication system further includes:

a microphone for converting first acoustic waves into a first signal;

a speaker for converting a second signal to second acoustic waves; and an encoder and decoder (CODEC) unit communicatively coupled to said microphone, said speaker and said cellular transceiver, said CODEC unit for converting said first signal into a third signal and transmitting said third signal to said cellular transceiver, and for converting a fourth signal received from said cellular transceiver into said second signal.

22. A computer system according to claim 17 wherein said cellular transceiver includes:

(a) a signal conditioning block comprising:

a CODEC driver for interfacing said CODEC unit to a multiplexer, said CODEC driver for converting said third signal into a fifth signal, said multiplexer for selecting one of a first data signal from said data pump and said fifth signal from said CODEC driver as an input and for outputting a sixth signal;

adjustable compression means for manipulating said sixth signal based on its amplitude and for outputting a seventh signal, said adjustable compression means that adjusts its characteristics depending on whether said sixth signal originated from said data pump or said CODEC unit;

adjustable pre-emphasis means for manipulating said seventh signal based on its frequency and for outputting an eighth signal, said adjustable pre-emphasis means that adjusts its characteristics depending on whether said seventh signal originated from said data pump or said CODEC unit;

a first adjustable filter for band-limiting said eighth signal and for outputting a ninth signal, said first adjustable filter that adjusts its characteristics depending on whether said eighth signal originated from said data pump or said CODEC unit;

a transmit buffer coupled to said first adjustable filter and to said D/A and A/D converter;

a receiver buffer coupled to said D/A and A/D converter;

a second adjustable filter for removing unwanted components of a tenth signal received from said receiver buffer and for producing an eleventh signal, said second adjustable filter that adjusts its characteristics depending on whether said tenth signal is destined to said data pump or said CODEC unit;

adjustable de-emphasis means for manipulating said eleventh signal based on its frequency and for outputting a twelfth signal, said adjustable de-emphasis means that adjusts its characteristics depending on whether said eleventh signal is destined to said data pump or said CODEC unit;

adjustable expansion means for manipulating said twelfth signal based on its amplitude and for outputting a thirteenth signal, said adjustable expansion means that adjusts its characteristics depending on whether said twelfth signal is destined to said data pump or said CODEC unit;

a de-multiplexer coupled to said CODEC driver for receiving said thirteenth signal as an input and for outputting one of a second data signal for said data pump or a fourteenth signal; and (b) a cellular signaling protocol block coupled to said receiver buffer and said transmit buffer.

23. A computer system according to claim 22 wherein said cellular transceiver includes:

(a) a signal conditioning block comprising:

a CODEC driver for interfacing a second decoder to said CODEC unit, said CODEC driver for converting said fourth signal to a fifth signal, said second decoder for converting said fifth signal that is non-linear into a sixth signal that is linear;

a multiplexer for selecting one of a first data signal from said data pump and said sixth signal from said second decoder as an input and for outputting a seventh signal;

adjustable compression means for manipulating said seventh signal based on its amplitude and for outputting an eighth signal, said adjustable compression means that adjusts its characteristics depending on whether said seventh signal originated from said data pump or said CODEC unit;

adjustable pre-emphasis means for manipulating said eighth signal based on its frequency and for outputting a ninth signal, said adjustable pre-emphasis means that adjusts its characteristics depending on whether said eighth signal originated from said data pump or said CODEC unit;

a first adjustable filter for band-limiting said ninth signal and for outputting a tenth signal, said first adjustable filter that adjusts its characteristics depending on whether said ninth signal originated from said data pump or said CODEC unit;

a transmit buffer coupled to said first adjustable filter and to said D/A and A/D converter;

a receiver buffer coupled to said D/A and A/D converter;

a second adjustable filter for removing unwanted components of an eleventh signal received from said receiver buffer and for producing a twelfth signal, said second adjustable filter that adjusts its characteristics depending on whether said eleventh signal is destined to said data pump or said CODEC unit;

adjustable de-emphasis means for manipulating said twelfth signal based on its frequency and for outputting a thirteenth signal, said adjustable de-emphasis means that adjusts its characteristics depending on whether said twelfth signal is destined to said data pump or said CODEC unit;

adjustable expansion means for manipulating said thirteenth signal based on its amplitude and for outputting a fourteenth signal, said adjustable expansion means that adjusts its characteristics depending on whether said thirteenth signal is destined to said data pump or said CODEC unit;

a de-multiplexer for receiving said fourteenth signal as an input and for outputting one of a second data signal for said data pump or a fifteenth signal;

an encoder unit coupled to said CODEC driver for receiving said fifteenth signal and converting said fifteenth signal into a sixteenth signal that is non-linear wherein said CODEC unit uses a non-linear transfer function; and (b) a cellular signaling protocol block coupled to said receiver buffer and said transmit buffer.

* * * * *